(12) United States Patent
Uechi et al.

(10) Patent No.: US 9,718,467 B2
(45) Date of Patent: Aug. 1, 2017

(54) IN-VEHICLE CONTROL DEVICE

(71) Applicant: TOYOTA JIDOSHA KABUSHIKI KAISHA, Toyota-shi (JP)

(72) Inventors: Masaaki Uechi, Nagoya (JP); Yoji Mizoguchi, Nagakute (JP); Hiroshi Harada, Nagakute (JP); Kumiko Kondo, Nisshin (JP); Naoki Taki, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/915,115

(22) PCT Filed: Aug. 20, 2014

(86) PCT No.: PCT/IB2014/001560
§ 371 (c)(1),
(2) Date: Feb. 26, 2016

(87) PCT Pub. No.: WO2015/028860
PCT Pub. Date: Mar. 5, 2015

(65) Prior Publication Data
US 2016/0207533 A1     Jul. 21, 2016

(30) Foreign Application Priority Data

Aug. 26, 2013 (JP) ................. 2013-174586

(51) Int. Cl.
*B60W 30/09* (2012.01)
*G08G 1/16* (2006.01)
(Continued)

(52) U.S. Cl.
CPC .......... *B60W 30/09* (2013.01); *B60W 50/045* (2013.01); *G01S 13/867* (2013.01);
(Continued)

(58) Field of Classification Search
CPC ................. G01S 13/87; G08G 1/166
(Continued)

(56) References Cited

U.S. PATENT DOCUMENTS 7,278,505 B2 * 10/2007 Fujioka ............... B60T 7/22
180/167
7,504,988 B2 * 3/2009 Tsuchihashi ............ G01S 13/34
342/158
(Continued)

FOREIGN PATENT DOCUMENTS

DE   10 2009 024 527 A1   3/2010
JP       2001-318149 A    11/2001
(Continued)

OTHER PUBLICATIONS

International Search Report Issued Jul. 29, 2015 in PCT/IB14/001560 Filed Aug. 20, 2014.

*Primary Examiner* — Tyler J Lee
(74) *Attorney, Agent, or Firm* — Oblon, McCelland, Maier & Neustadt, L.L.P.

(57) ABSTRACT

An in-vehicle control device includes a first sensor that acquires obstacle information in a first detection range, a second sensor that acquires obstacle information in a second detection range, the second detection range is nearer to a host vehicle than the first detection range, and a processor configured to perform predetermined control for preventing collision with an obstacle or for reducing damage at collision time based on the obstacle information received from the first sensor and the second sensor and, when the obstacle is not detected by the first sensor and the second sensor after starting the predetermined control based on the obstacle information received from the first sensor, uses positional relation information to determine whether the predetermined control is to be continued wherein the positional relation information indicates a height-direction positional relation
(Continued)

between a predetermined part of the obstacle and the first detection range or the second detection range.

6 Claims, 6 Drawing Sheets

(51) Int. Cl.
  *B60W 50/04* (2006.01)
  *G01S 17/87* (2006.01)
  *G01S 17/93* (2006.01)
  *G01S 13/86* (2006.01)
  *G01S 13/87* (2006.01)
  *G01S 13/93* (2006.01)
  *G01S 7/40* (2006.01)

(52) U.S. Cl.
  CPC .............. *G01S 13/87* (2013.01); *G01S 17/87* (2013.01); *G01S 17/936* (2013.01); *G08G 1/166* (2013.01); *B60W 2420/42* (2013.01); *B60W 2420/52* (2013.01); *B60W 2520/16* (2013.01); *B60W 2550/142* (2013.01); *G01S 2007/4034* (2013.01); *G01S 2007/4091* (2013.01); *G01S 2013/9364* (2013.01); *G01S 2013/9367* (2013.01); *G01S 2013/9382* (2013.01)

(58) Field of Classification Search
  USPC .................................................... 701/36, 301
  See application file for complete search history.

(56) References Cited

U.S. PATENT DOCUMENTS

| | | | |
|---|---|---|---|
| 8,311,730 B2* | 11/2012 | Neff ....................... | B60W 40/02 701/1 |
| 2006/0088188 A1* | 4/2006 | Ioffe .................. | G06K 9/00369 382/103 |
| 2007/0205938 A1* | 9/2007 | Zimmermann ......... | G01S 13/87 342/69 |
| 2010/0152963 A1* | 6/2010 | Heckel .................. | B60W 30/17 701/29.2 |
| 2012/0166058 A1* | 6/2012 | Armbrust ............... | B60Q 1/525 701/96 |

FOREIGN PATENT DOCUMENTS

| | | |
|---|---|---|
| JP | 2003-172780 A | 6/2003 |
| JP | 2004-9885 A | 1/2004 |
| JP | 2006-48435 A | 2/2006 |

\* cited by examiner

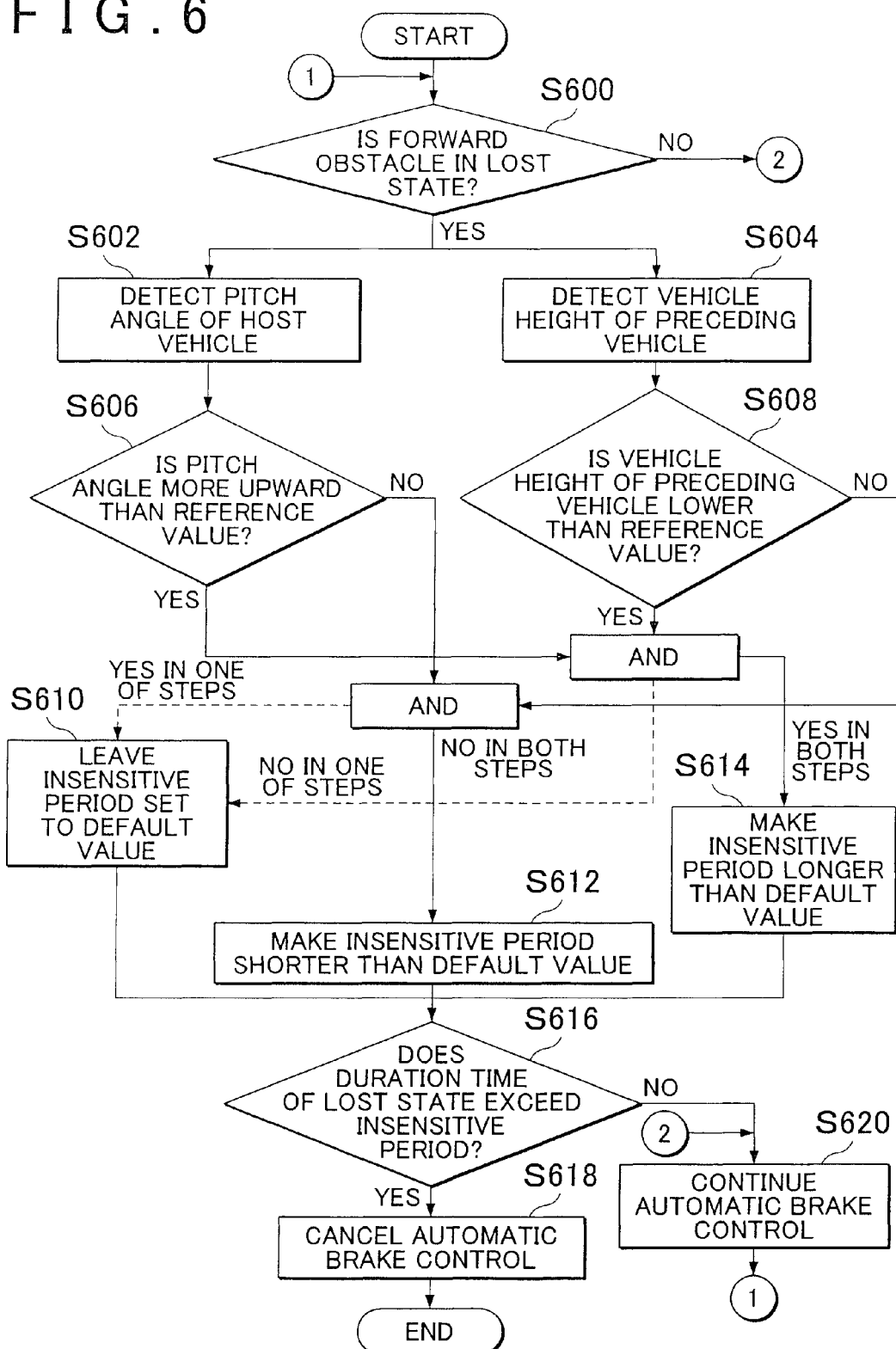

IN-VEHICLE CONTROL DEVICE

BACKGROUND OF THE INVENTION

1. Field of the Invention

The present invention relates to an in-vehicle control device.

2. Description of Related Art

A technology is known that continues to detect a vehicle by means of a camera image even when the vehicle, which has been detected by a radar, is lost due to a pitching variation of a host vehicle (for example, Japanese Patent Application Publication No. 2006-048435 (JP 2006-048435 A).

When two sensors, each with its own detection area, are used (the detection areas may be partially overlapped), a sensor of these two sensors that detects an obstacle is switched (changed) from the one that has a farther detection area to the other that has a nearer detection area as the obstacle gets nearer to the vehicle. At this sensor switching time, both sensors may temporarily lose the obstacle in some cases (in other words, both cannot detect the obstacle and a lost state is generated). Considering this, the control operation for an obstacle may be continuously performed (for example, applies the automatic brake) at this switching time for a fixed time while accepting the lost state. However, if this fixed time is short, the control operation for the obstacle may not be continued properly. On the other hand, if this fixed time is long, the control operation for the obstacle may be continued longer than is necessary when there is no actual obstacle but the lost state is generated.

SUMMARY OF THE INVENTION

In view of the foregoing, the present invention provides an in-vehicle control device capable of continuing (or canceling) predetermined control for an obstacle in a suitable manner.

An in-vehicle control device in one aspect of the present invention includes a first sensor that acquires obstacle information in a first detection range; a second sensor that acquires obstacle information in a second detection range, the second detection range being nearer to a host vehicle than the first detection range; and a processing device that performs predetermined control for preventing collision with an obstacle or for reducing damage at collision time based on the obstacle information received from the first sensor and the second sensors and, if the obstacle is not detected by the first sensor and the second sensor after starting the predetermined control based on the obstacle information received from the first sensor, uses positional relation information to determine whether the predetermined control is to be continued, the positional relation information indicating a height-direction positional relation between a predetermined part of the obstacle and the first detection range or the second detection range.

The present invention provides an in-vehicle control device capable of continuing (or canceling) predetermined control for an obstacle in a suitable manner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart showing an example of processing executed by a collision determination ECU.

DETAILED DESCRIPTION OF THE EMBODIMENTS

Embodiments are described in detail below with reference to the attached drawings.

Figure 1:
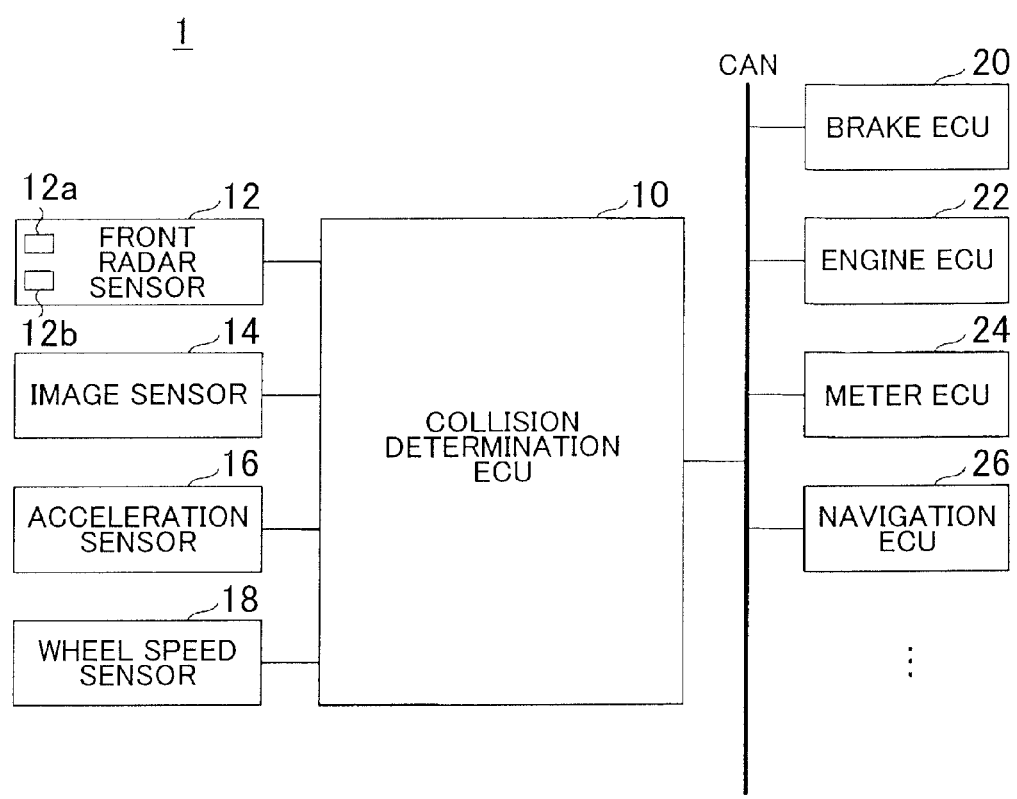
FIG. 1 is a configuration diagram showing a schematic configuration of an in-vehicle control device in one embodiment of the present invention.

FIG. 1 is a configuration diagram showing a schematic configuration of an in-vehicle control device 1 in one embodiment. The in-vehicle control device 1 includes a collision determination electronic control unit (ECU) 10. As with other ECUs, the collision determination ECU 10 may be configured by a microcomputer. The function of the collision determination ECU 10 may be implemented by any hardware, software, firmware, or a combination of them. For example, any function of the collision determination ECU 10 may be implemented, in part or in whole, by an application-specific integrated circuit (ASIC), a field programmable gate array (FPGA), or a digital signal processor (DSP). In addition, the function of the collision determination ECU 10 may be implemented by the cooperation of multiple ECUs.

A front radar sensor 12 is connected to the collision determination ECU 10. The front radar sensor 12 may be mounted in any position of a vehicle. For example, the front radar sensor 12 may be mounted in a vehicle interior (for example, near the upper edge of the inner mirror or the front windshield) or in a bumper. The front radar sensor 12 uses a light wave (laser in this example) as the detection wave to detect a forward obstacle (typically, a preceding vehicle) ahead of the vehicle. The front radar sensor 12 may be configured to detect a forward obstacle, for example, when the intensity of the reflected wave is equal to or higher than a predetermined threshold. Upon detecting a forward obstacle, the front radar sensor 12 may detect obstacle information, which indicates the relation between the forward obstacle and the host vehicle, at a periodic interval. The obstacle information includes information such as the relative speed, relative distance, and direction (horizontal position) of the forward obstacle in relation to the host vehicle. The obstacle information obtained by the front radar sensor 12 is sent to the collision determination ECU 10 at a predetermined periodic interval. The function of the front radar sensor 12 (for example, the function to calculate the position of a forward obstacle) may be implemented by the collision determination ECU 10.

The front radar sensor 12 includes a first sensor unit 12a and a second sensor unit 12b that have detection areas different from each other. The first sensor unit 12a and the second sensor unit 12b may be formed by separate sensors or may be formed integrally with the common parts (circuits) shared partially. The function of the first sensor unit 12a and the second sensor unit 12b will be described later.

An image sensor 14 may be connected to the collision determination ECU 10. The image sensor 14 includes a camera, which includes imaging elements such as a charge-coupled device (CCD) and a complementary metal oxide semiconductor (CMOS), and an image processing device. The image sensor 14 with this configuration may recognize the image of a forward obstacle. The camera included in the image sensor may be a stereo camera. The image sensor may recognize a forward obstacle by pattern matching. The information (detection result) acquired by the image sensor may be sent to the collision determination ECU 10 at a predetermined periodic frame interval. The image processing function of the image processing device may be implemented by the collision determination ECU 10.

Various electronic parts in the vehicle may be connected to the collision determination ECU 10 via an appropriate bus such as a controller area network (CAN). In the example shown in FIG. 1, a brake ECU 20 that controls the brake device (not shown), an engine ECU 22 that controls the engine (not shown), a meter ECU 24, a navigation ECU 26, and so on are connected to the collision determination ECU 10.

Various sensors, such as an acceleration sensor 16 and a wheel speed sensor 18, may be connected to the collision determination ECU 10. To the collision determination ECU 10, the acceleration sensor 16 and the wheel speed sensor 18 may be connected directly as shown in FIG. 1 or via an appropriate bus such as a CAN. The collision determination ECU 10 detects acceleration, generated in the vehicle, based on the information received from the acceleration sensor 16. The acceleration sensor 16 may be a sensor that detects acceleration in the tri-axial direction. The collision determination ECU 10 detects the vehicle speed based on the information received from the wheel speed sensor. The vehicle speed may be calculated based on other information (for example, number of rotations of the output axis of the transmission) in place of, or in addition to, the information received from the wheel speed sensor.

Figure 2:
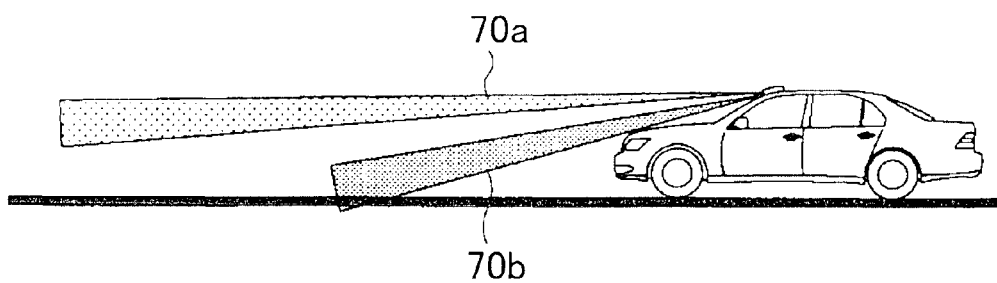
FIG. 2 is a diagram schematically showing an example of the detection ranges of a front radar sensor.

FIG. 2 is a diagram schematically showing an example of the detection ranges of the front radar sensor 12.

The first sensor unit 12a of the front radar sensor 12 has a first detection range 70a. That is, the first sensor unit 12a emits a laser beam that forms the first detection range 70a. The second sensor unit 12b of the front radar sensor 12 has a second detection range 70b. That is, the second sensor unit 12b emits a laser beam that forms the second detection range 70b.

The second detection range 70b is formed nearer to the vehicle than the first detection range 70a. That is, the second sensor unit 12b emits a laser beam more downward than the first sensor unit 12a. The first sensor unit 12a and the second sensor unit 12b may generate separate laser beams by separating and deflecting a laser light from the same laser light source using a beam splitter and a prism or may use separate laser light sources.

The first detection range 70a and the second detection range 70b may be completely separated in a vertical direction (pitch direction) as shown in FIG. 2 or they may be partially overlapped. It should be noted that they are not overlapped in such a way that one range is completely included in the other. For example, in the description below, the first detection range 70a and the second detection range 70b are assumed completely separated in the vertical direction, as shown in FIG. 2, unless otherwise stated. The range in the vertical direction between the first detection range 70a and the second detection range 70b is called also an "insensitive range". In the example shown in FIG. 2, both the first detection range 70a and the second detection range 70b are spread out in a wide fan with the center angle (vertical angle) of each sector being six degrees.

When viewed from top of the vehicle, the first detection range 70a may extend in the front direction, and the second detection range 70b in the side directions, of the vehicle. The second detection range 70b may be formed on both sides of the vehicle. That is, when viewed from top of the vehicle, the first detection range 70a may be positioned in the center in the horizontal direction of the vehicle, and the second detection range 70b in the outside of the first detection range 70a in the horizontal direction of the vehicle. When viewed from top of the vehicle, the first detection range 70a and the second detection range 70b may be completely separated or partially overlapped. In the description below, to distinguish between the two laser beams, the laser beam emitted by the first sensor unit 12a is called a "center beam", and the laser beam emitted by the second sensor unit 12b is called a "side beam".

Next, the following describes an example of automatic brake control performed by the collision determination ECU 10 and the brake ECU 20.

The collision determination ECU 10 determines an automatic brake control start condition based on the information received from the front radar sensor 12. The automatic brake control start condition may be any condition for starting automatic brake control. For example, in the case of collision avoidance control for avoiding collision with a forward obstacle, the time to collision (TTC) with the forward obstacle is calculated first and, based on the calculated TTC, the automatic brake control start condition is created as a condition that is satisfied when the TTC becomes smaller than a predetermined value (for example, one second). In this case, the collision determination ECU 10 calculates the TTC for the forward obstacle in a predetermined direction (horizontal position) based on the detection result received from the front radar sensor 12. When the calculated TTC becomes smaller than a predetermined value (for example, one second), the collision determination ECU 10 outputs an automatic brake control request. The TTC may be derived by dividing the relative distance to a forward obstacle by the relative speed at which the vehicle approaches the forward obstacle. In the case of automatic drive control, the automatic brake control start condition may be a condition that is satisfied when the amount of deceleration, required to maintain the lower limit of the distance between the preceding vehicle and the host vehicle, becomes larger than a predetermined value.

In addition, the automatic brake control start condition may be a condition that is satisfied when it is determined that collision with a forward obstacle (including a preceding vehicle) cannot be avoided. That is, the automatic brake control start condition may be a condition that is satisfied when the possibility of collision with a forward obstacle becomes equal to or higher than a predetermined level (100% in this case). Various methods are known in the field of pre-crash safety for determining whether collision with a forward obstacle cannot be avoided. Any of these methods may be used. For example, the relative speed, at which collision can be avoided, is calculated in advance for each automatic brake control start time (TTC) and, based on the calculated relative speed, a collision unavoidable determination map is created. In this case, based on the relative speed with respect to a forward obstacle and on the TTC, the collision determination ECU 10 may reference the collision unavoidable determination map to determine whether collision with the forward obstacle is unavoidable. More specifically, the deceleration $G(m/s^2)$ after t seconds from the start of automatic brake control and the deceleration speed V (m/s) satisfy the following relation: $G=Jt$ and $V=J\times t^2/2$ when $t \leq G_{MAX}/J$, and $G=G_{MAX}$ and $V=G_{MAX}^2/(2J)+G_{MAX}(t-G_{MAX}/J)$ when $G_{MAX}/J<t$, where $G_{MAX}(m/s^2)$ is the maximum speed and J $(m/s^3)$ is the deceleration gradient. In this case, a collision unavoidable determination map may be created assuming that a relative speed higher than the deceleration speed V after t seconds as a collision unavoidable relative speed. A collision unavoidable determination map may also be created with a relative distance as the parameter by calculating the relative distance through integration of the deceleration speed V. As a more complex algorithm, the acceleration of a forward obstacle may be considered.

When the automatic brake control start condition is satisfied, the collision determination ECU 10 may continue to output an automatic brake control request to the brake ECU 20 until an automatic brake control termination condition or an automatic brake cancellation condition is satisfied. The automatic brake control termination condition is any condition for terminating automatic brake control. For example, this condition may be satisfied when collision is detected, when the vehicle body speed becomes 0 km/h, when the TTC becomes larger than 1.5 [seconds], or when the automatic brake control request continues for a predetermined time (for example, three seconds) or longer. The automatic brake cancellation condition is any condition for cancelling automatic brake control. For example, this condition may be satisfied when a forward obstacle is not detected by the front radar sensor 12 in a predetermined mode.

The brake ECU 20 performs automatic brake control according to an automatic brake control request received from the collision determination ECU 10. The automatic brake control refers to a control operation for increasing the wheel cylinder pressure of a wheel cylinder in a situation in which the driver does not step on the brake. This means that the target control value at an automatic brake control time is a value that should be determined based on a factor other than the operation amount of the brake pedal. The target control value may be a fixed value or a variable value. When a fixed value, the target control value may vary over time. The target control value may vary according to the vehicle speed at the automatic brake control start time. The target control value may be a physical amount such as the value of a deceleration, an oil pressure, or a pressure-increasing gradient. Automatic brake control may be performed in any mode. For example, the same target control value may be uniformly applied or, considering the vehicle behavior at sudden braking time, different target control values (for example, different target control values for the front wheels and rear wheels) may be applied, to the wheel cylinder pressure of the wheel cylinders of four wheels.

Figure 3A:
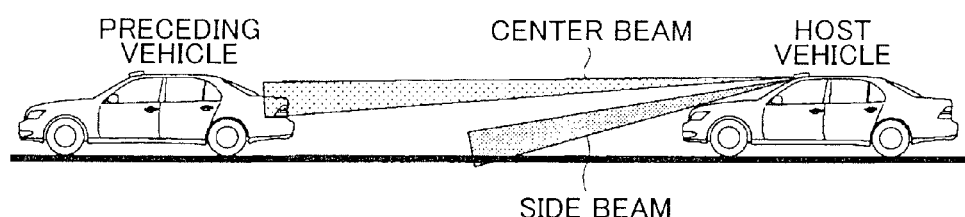
FIG. 3A is a diagram schematically showing an example of the relation among a forward obstacle, a first detection range, and a second detection range during execution of automatic brake control.
Figure 3B:
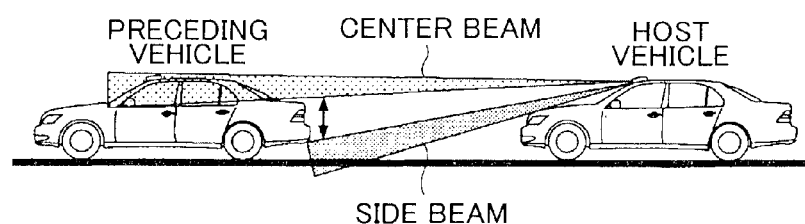
FIG. 3B is a diagram schematically showing an example of the relation among a forward obstacle, a first detection range, and a second detection range during execution of automatic brake control.
Figure 3C:
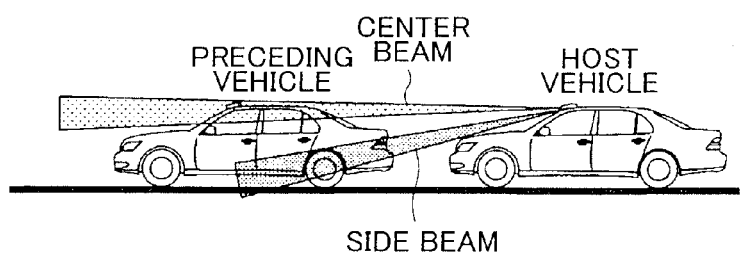
FIG. 3C is a diagram schematically showing an example of the relation among a forward obstacle, a first detection range, and a second detection range during execution of automatic brake control.
Figure 4A:
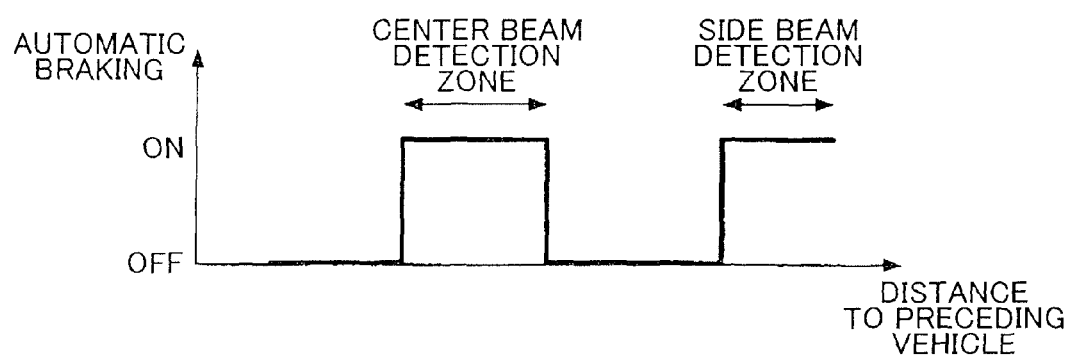
FIG. 4A is a diagram showing an example of the relation between the detection state (on/off state) of preceding-vehicle by the front radar sensor 12 and the distance to the preceding vehicle.
Figure 4B:
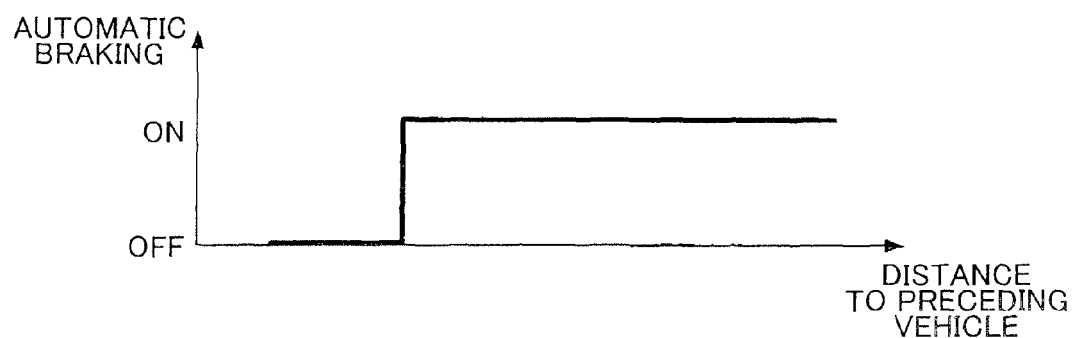
FIG. 4B is a diagram showing an example of the relation between an automatic brake control state and the distance to the preceding vehicle.

FIGS. 3A-3C are diagrams schematically showing an example of change in the relation between a forward obstacle and the first detection range 70a and the second detection range 70b (center beam and side beam) during execution of automatic brake control. FIGS. 4A and 4B are diagrams corresponding to FIGS. 3A-3C. FIG. 4A shows an example of the relation between the detection state (on/off state) of a preceding-vehicle by the front radar sensor 12 and the distance to the preceding vehicle. FIG. 4B shows an example of the relation between the automatic brake control state (on/off state) and the distance to the preceding vehicle. The on state of the preceding-vehicle detection state refers to the state in which the preceding vehicle is detected by the front radar sensor 12 (for example, the intensity of the reflected wave from the preceding vehicle is equal to or higher than a predetermined threshold).

In the state shown in FIG. 3A, the center beam strikes the preceding vehicle (an example of a forward obstacle). Therefore, the preceding vehicle is detected by the first sensor unit 12a that uses the center beam (see the center beam detection zone in FIG. 4A). Because the distance to the preceding vehicle is relatively long in the state shown in FIG. 3A, the preceding vehicle is not detected by the side beam (second sensor unit 12b). At this time, if the automatic brake control start condition is satisfied based on the information received from the first sensor unit 12a, the collision determination ECU 10 starts automatic brake control. In the examples shown in FIGS. 4A and 4B, automatic brake control is started (on) at the same time the preceding vehicle is detected by the first sensor unit 12a.

In the state shown in FIG. 3B, the distance to the preceding vehicle becomes shorter and, as a result, the center beam strikes the rear glass of the preceding vehicle. In this state, the center beam sometimes transmits through the rear glass with no reflection, in which case the preceding vehicle cannot be detected by the first sensor unit 12a (that is, the first sensor unit 12a loses the preceding vehicle). In this state, the side beam does not yet strike the preceding vehicle, meaning that the preceding vehicle is not detected either by the side beam in some cases. Therefore, in the state shown in FIG. 3B, the preceding vehicle is detected neither by the first sensor unit 12a nor by the second sensor unit 12b in some cases. In the description below, the state in which a forward obstacle (a preceding vehicle in this example), which is once detected, becomes detected neither by the first sensor unit 12a nor by the second sensor unit 12b is called simply the "lost state". In the example shown in FIG. 4A, the lost state is generated between the center beam detection zone and the side beam detection zone.

In the state shown in FIG. 3C, the distance to the preceding vehicle becomes still shorter and, as a result, the side beam strikes the preceding vehicle. Therefore, the preceding vehicle is detected by the second sensor unit 12b that uses the side beam (see the side beam detection zone in FIG. 4A). That is, the lost state is solved. In the state shown in FIG. 3C, the center beam strikes the rear glass of the preceding vehicle or a part above it with the result that the preceding vehicle is not detected by the center beam. At this time, the collision determination ECU 10 can continue automatic brake control based on the information received from the second sensor unit 12b.

When the lost state such as the one shown in FIG. 3B is generated after automatic brake control is started, it is useful to continue automatic brake control. This is because such a lost state is generated only in a temporary period during which the sensor unit, capable of detecting the preceding vehicle, is switched (changed) from the first sensor unit 12a to the second sensor unit 12b. The preceding vehicle is not actually lost.

Therefore, when the lost state is generated as described above after automatic brake control is started, the collision determination ECU 10 does not react (does not become insensitive) to such a lost state but continues automatic brake control (see FIG. 4B). At this time, the target control value of automatic brake control may be the previous value, a value that reduces braking as compared to the previous value, or a value equal to the value that would be used as if the preceding vehicle was detected.

It should be noted here that, also when the driver performs the collision avoidance operation (for example, turns the wheel) after automatic brake control is started, the lost state may be generated similarly in which the once-detected forward obstacle is detected neither by the first sensor unit 12a nor by the second sensor unit 12b. In such a case, it is desirable that automatic brake control be canceled as soon as possible.

To address the above-described situation, this embodiment makes variable the length of the period (insensitive period), during which the collision determination ECU 10 is insensitive to the lost state as described above after automatic brake control is started, as described below in detail. By doing so, this embodiment prevents automatic brake control from being continued in a situation in which automatic brake control should be canceled and, at the same time, prevents automatic brake control from being canceled by the lost state that is generated when the first sensor unit 12a is changed to the second sensor unit 12b.

Figure 5:
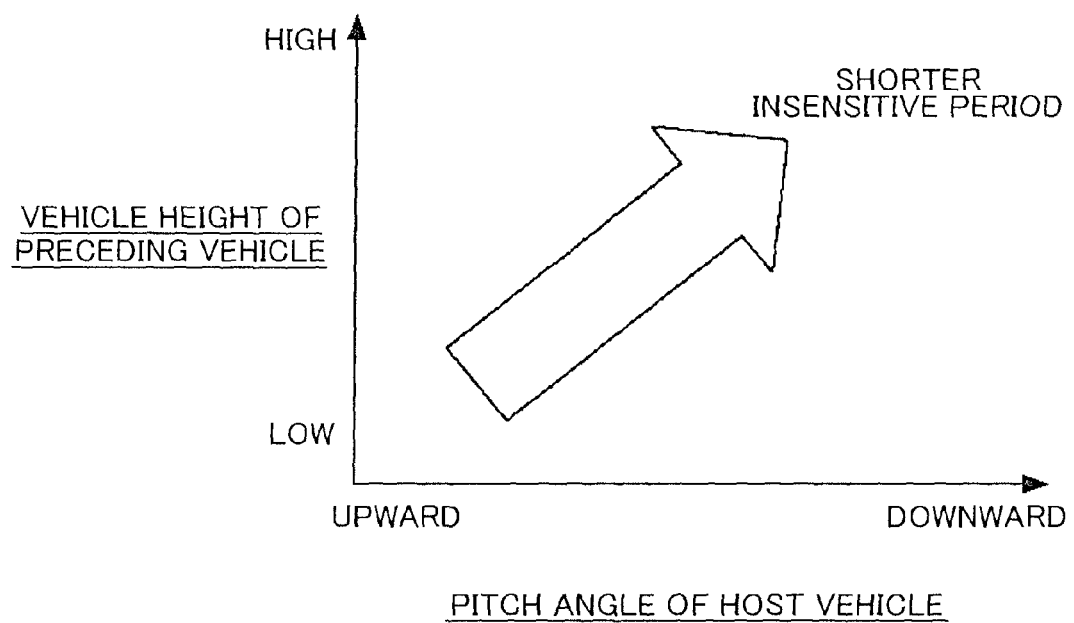
FIG. 5 is a diagram schematically showing an example of the variable mode of an insensitive period.

FIG. 5 is a diagram schematically showing an example of the variable mode of an insensitive period.

As shown in FIG. 5, the insensitive period may be made variable in such a way that the insensitive period becomes shorter as the pitch angle of the vehicle (host vehicle) increases (positive in downward direction). This is because, in general, the distance between the preceding vehicle and the host vehicle becomes shorter in the state shown in FIG. 3B (in which the center beam strikes the rear glass) as the pitch angle of the vehicle increases. That is, in general, as the pitch angle of the vehicle increases, the preceding vehicle can be kept detected by the center beam at a shorter distance and, as a result, the period of the lost state becomes shorter. Typically, the longer the vertical distance $\Delta H$ (see FIG. 3B) between the center beam and the side beam is at the trailing edge position of the preceding vehicle in the lost state, the longer is the period of the lost state.

The changing mode of the insensitive period for a pitch angle, which has the above-described tendency, may be any mode. For example, the insensitive period may be changed between two values such as the first time for a positive pitch angle (downward) and the second time (>first time) for a negative pitch angle (upward). The insensitive period may also be changed among two or more levels.

As shown in FIG. 5, the insensitive period may be made variable in such a way that the insensitive period becomes shorter as the height of the forward obstacle (vehicle height of the preceding vehicle in this example) is larger. This is because, in general, the distance between the preceding vehicle and the host vehicle becomes shorter in the state shown in FIG. 3B (in which the center beam strikes the rear glass) as the vehicle height of the preceding vehicle increases. That is, in general, as the vehicle height of the preceding vehicle increases, the preceding vehicle can be kept detected by the center beam at a shorter distance and, as a result, the period of the lost state becomes shorter.

The changing mode of the insensitive period for the vehicle height of a preceding vehicle, which has the above-described tendency, may be any mode. For example, the insensitive period may be changed between two values such as the first time for the vehicle height of the preceding vehicle that is equal to or larger than the reference value and the second time (>first time) for the vehicle height of the preceding vehicle that is smaller than the reference value. The insensitive period may also be changed among two or more levels.

In this way, with focus on the fact that the duration time of a lost state caused by the change from the first sensor unit 12a to the second sensor unit 12b depends on the pitch angle of a vehicle or on the height of a forward obstacle, the insensitive period is changed according to the pitch angle or the height of the forward obstacle. This allows automatic brake control to be continued or canceled suitably.

The insensitive period may be changed according to one or both of the pitch angle and the height of a forward obstacle. In addition, the insensitive period may be changed according to a parameter other than the pitch angle and the height of a forward obstacle. This parameter may be any parameter that directly or indirectly represents the height-direction positional relation between a predetermined part of the forward obstacle and the first detection range 70a or the second detection range 70b as with the pitch angle or the height of a forward obstacle. Note that the height-direction positional relation between a predetermined part the forward obstacle and the first detection range 70a or the second detection range 70b equivalently includes the height-direction positional relation between the predetermined part of the forward obstacle and the insensitive range (range between the first detection range 70a and the second detection range 70b). In addition, the height-direction positional relation, which is substantially equivalent to the pitch-direction positional relation, equivalently includes the pitch-direction positional relation.

The parameter representing the height-direction positional relation with the first detection range 70a or the second detection range 70b may be the height of a predetermined part of the forward obstacle. The predetermined part may be the upper part of the forward obstacle. In this case, when the forward obstacle is a preceding vehicle, the parameter is the height of the vehicle. When the forward obstacle is a preceding vehicle, the predetermined part may be a reflecting part (for example, a reflector or a license plate) by which a laser light is reflected. In this case, the insensitive period may be made variable in such a way that the insensitive period becomes longer as the upper end of the predetermined part is lower. Conversely, the predetermined part may be a part through which a laser light easily transmits (for example, a rear glass). In this case, the insensitive period may be made variable in such a way that the insensitive period becomes longer as the lower end of the rear glass is lower. The height of a predetermined part of the forward obstacle may be calculated based on the image recognition result obtained by the image sensor 14 or may be derived based on the preceding-vehicle information that can be obtained via vehicle-to-vehicle communication.

Another parameter that represents the height-direction positional relation with the first detection range 70a or the second detection range 70b may be a difference between the road slope at the position of a forward obstacle and the road slope at the position of the vehicle (host vehicle). This is because such a difference in the road slope affects the length of the duration time of the lost state caused by the change from the first sensor unit 12a to the second sensor unit 12b as in the pitch angle of the host vehicle. In this case, the insensitive period may be made variable in such a way that the insensitive period becomes longer as the road slope at the position of the vehicle is more upward than the road slope at the position of the forward obstacle. The difference in the road slope may be calculated based on the map information (for example, the information obtained from the navigation ECU 26) or may be calculated based on the image recognition result obtained by the image sensor 14. When the image sensor 14 is used, the position of an image may be changed as follows according to a change in the road slope. For example, when the road slope at the position of the vehicle becomes more upward than the road slope at the position of the forward obstacle, the image position of the forward obstacle moves to a lower position in the vertical direction of the image though the distance to the forward obstacle remains the same. The difference in the road slope may be calculated using this fact.

FIG. 6 is a flowchart showing an example of processing executed by the collision determination ECU 10. The processing routine shown in FIG. 6 may be repeated at a predetermined periodic interval until the automatic brake control termination condition is satisfied during execution of automatic brake control. Typically, automatic brake control is started when a forward obstacle is detected by the first sensor unit 12a and the automatic brake control start condition is satisfied (see FIG. 3A). Although not shown in FIG. 6, the processing routine shown in FIG. 6 may be terminated immediately if the automatic brake control termination condition is satisfied during the processing shown in FIG. 6.

In step 600, based on the information received from the front radar sensor 12, the collision determination ECU 10 determines whether a forward obstacle (forward obstacle associated with automatic brake control in execution), which has started the current processing routine, is in the lost state. The lost state refers to a state in which a forward obstacle (a preceding vehicle in this example), which has been detected by the first sensor unit 12a, is detected neither by the first sensor unit 12a nor by the second sensor unit 12b as described above. If the forward obstacle is in the lost state, the collision determination ECU 10 executes the processing of both step 602 and step 604 in parallel. On the other hand, if the forward obstacle is not in the lost state, the processing proceeds to step 620. When the lost state is detected for the first time, the timer is started to measure (count) the duration time of the lost state.

In step 602, the collision determination ECU 10 detects (calculates) the pitch angle of the host vehicle. Any method for detecting the pitch angle of the host vehicle may be used. For example, the pitch angle is calculated based on the information received from the acceleration sensor 16 and the wheel speed sensor 18. More specifically, an approximation formula (or a map) for estimation is generated by measuring in advance the relation between the braking-time acceleration (primarily the acceleration in the vertical direction) detected in advance in the tri-axial direction and the pitch angle generated in the vehicle at that time. In this case, the acceleration obtained from the acceleration sensor 16 is substituted in the approximation formula (or map) to calculate the pitch angle. Instead of using the acceleration sensor, the pitch angle may be estimated based on the master cylinder pressure or the wheel cylinder pressure. The method for estimating the pitch angle in this case may be any of the following methods. One of the methods is that an approximation formula is prepared, as in the method described above, by measuring the relation between the master cylinder pressure or the wheel cylinder pressure and the estimated pitch angle as data in advance for each vehicle. Another method is that the information on the vehicle speed at brake start time, the kinetic friction coefficient of the tires, and the vehicle weight is applied to a vehicle model prepared in advance. In addition, the pitch angle may be calculated based on the image recognition result produced by the image sensor 14. For example, when the pitch angle of the host vehicle becomes more upward, the image position of the preceding vehicle moves to a lower position in the vertical direction of the image though the distance to the forward obstacle remains the same. The pitch angle may be calculated using this fact.

In step 604, the collision determination ECU 10 detects the vehicle height of the preceding vehicle. The method for detecting the vehicle height of the preceding vehicle may be any method. For example, the vehicle height of the preceding vehicle may be calculated based on the image recognition result produced by the image sensor 14 or may be derived based on the preceding vehicle information (such as the vehicle type information or vehicle height information) that can be obtained via vehicle-to-vehicle communication. In the case of image recognition, pattern matching may be used.

In step 606, the collision determination ECU 10 determines whether the pitch angle is more upward than the predetermined reference value. The predetermined reference value may be any value such as 0 or a value indicating an upward angle. For example, the predetermined reference value corresponds to the minimum value (minimum of the absolute value) of the upward pitch-angle range over which the pitch angle is determined when the duration time of the lost state, caused by the change from the first sensor unit 12a to the second sensor unit 12b, becomes longer than the default value (see step 610). This reference value may be adapted by a test.

In step 608, the collision determination ECU 10 determines whether the vehicle height of the preceding vehicle is lower than the predetermined reference value. The predetermined reference value may be any value. For example, the predetermined reference value corresponds to the maximum value of the vehicle height range of the preceding vehicle over which the vehicle height is determined when the duration time of the lost state, caused by the change from the first sensor unit 12a to the second sensor unit 12b, becomes longer than the default value (see step 610). This reference value may be adapted by a test.

The processing proceeds to one of the following steps according to the result of determination in step 606 and step 608. If the pitch angle is more upward than the predetermined value and if the vehicle height of the preceding vehicle is lower than the predetermined reference value, the processing proceeds to step 614. If the pitch angle is more upward than the predetermined reference value or if the vehicle height of the preceding vehicle is lower than the predetermined reference value, the processing proceeds to step 610. If none of the conditions is satisfied, the processing proceeds to step 612.

In step 610, the insensitive period is left set to the default value (for example, 50 msec) and the processing proceeds to step 616.

In step 612, the insensitive period is made shorter than the default value and the processing proceeds to step 616. For example, when the default value is 50 msec, the insensitive period is reduced to 40 msec.

In step 614, the insensitive period is made longer than the default value and the processing proceeds to step 616. For example, when the default value is 50 msec, the insensitive period is extended to 60 msec.

In step 616, the collision determination ECU 10 determines whether the duration time of the lost state exceeds the insensitive period (insensitive period that was set in step 610, step 612, or step 614 described above). If the duration time of the lost state exceeds the insensitive period, the processing proceeds to step 618; otherwise, the processing proceeds to step 620.

In step 618, the automatic brake control is canceled (stopped) and the current processing routine is terminated.

In step 620, the automatic brake control is continued and the processing returns to step 600.

In the processing shown in FIG. 6, the collision determination ECU 10 changes the length of the insensitive period according to the pitch angle of the host vehicle or the vehicle height of the preceding vehicle, suitably continuing or canceling automatic brake control. For example, if the pitch angle of the host vehicle or the vehicle height of the preceding vehicle is included in the range in which the duration time of the lost state, caused by the change from the first sensor unit 12a to the second sensor unit 12b, is not significantly increased, the insensitive period is set to the default value or is reduced. This allows automatic brake control to be canceled responsively when automatic brake control is not required. On the contrary, if the pitch angle of the host vehicle or the vehicle height of the preceding vehicle is included in the range in which the duration time of the lost state, caused by the change from the first sensor unit 12a to the second sensor unit 12b, is increased, the insensitive period is extended (increased). This prevents automatic brake control from being canceled when automatic brake control need not essentially be canceled.

In the processing shown in FIG. 6, though changed according to both the pitch angle of the host vehicle and the vehicle height of the preceding vehicle, the insensitive period may also be changed according to only one of them or using other parameters (described above). For example, the insensitive period may be changed considering the vehicle height of the preceding vehicle only when the height of the preceding vehicle can be detected. The image sensor 14 may be omitted when only the pitch angle of the host vehicle is used.

In the processing shown in FIG. 6, though the processing proceeds to step 610 if the pitch angle is more upward than the predetermined reference value or if the vehicle height of the preceding vehicle is lower than the predetermined reference value as the result of determination in step 606 and step 608, the processing may also proceed to step 614.

In the processing shown in FIG. 6, though increased or decreased with respect to the default value according to the pitch angle of the host vehicle, the insensitive period may be only increased with respect to the default value or only decreased with respect to the default value. For example, in a configuration in which the insensitive period is only decreased with respect to the default value, the default value may be set to a relatively large value. In this case, if the pitch angle of the host vehicle is more downward than the predetermined reference value or if the vehicle height of the preceding vehicle is higher than the predetermined reference value, the insensitive period may be set by reducing the default value. In this case, each of the predetermined reference values may be different from the corresponding predetermined reference value used in step 606 and step 608. For example, the predetermined reference value associated with the pitch angle of the host vehicle corresponds to the minimum value (minimum of the absolute value) of the downward pitch-angle range over which the pitch angle is determined when the duration time of the lost state, caused by the change from the first sensor unit 12a to the second sensor unit 12b, becomes significantly shorter than the default value (see step 610). This reference value may be adapted by a test. In addition, the predetermined reference value, associated with the vehicle height of the preceding vehicle corresponds to the minimum value of the vehicle height range of the preceding vehicle over which the vehicle height of the preceding vehicle is determined when the duration time of the lost state, caused by the change from the first sensor unit 12a to the second sensor unit 12b, becomes significantly shorter than the default value (see step 610). This reference value may be adapted by a test.

While the embodiments of the present invention have been described above in detail, it is to be understood that the present invention is not limited to the specific embodiments and that various modifications and changes may be made within the scope of claims. It is also possible to combine all or some of the components in the embodiments described above.

For example, though the insensitive period is a time factor in the embodiments above, an insensitive zone may be set by another factor. For example, the decrease amount of the relative distance to the forward obstacle after the lost state is detected is calculated (estimated) and, if the decrease amount of the relative distance is within a predetermined insensitive zone distance, it is possible to limit the cancellation of automatic brake control according to the lost state. In a simpler configuration, the travel distance of the host vehicle from the time the lost state is detected is calculated and, if the travel distance is within a predetermined insensitive zone distance, it is possible to limit the cancellation of automatic brake control according to the lost state.

The present invention, which relates to the cancellation of automatic brake control in the embodiments above, is applicable also to the cancellation of warning control. That is, the present invention is applicable to a configuration in which a warning is output instead of performing automatic brake control. In this case, when a warning output condition, similar and corresponding to an automatic brake control start condition, is satisfied in the same manner the automatic brake control start condition is satisfied in automatic brake control, a warning is output under control of the meter ECU 24. After that, the warning output state is canceled when a predetermined cancellation condition is satisfied and is terminated when a warning termination condition, similar and corresponding to the automatic brake control termination condition, is satisfied. The concept of the cancellation condition for warning output (variable mode of insensitive period) may be similar to that of the cancellation condition for automatic brake control.

The present invention, which relates to the cancellation of automatic brake control in the embodiments above, is applicable also to the cancellation of other controls that are executed for reducing damage at collision time. The other controls include the winding control of a pre-crash seat belt (seat belt pretensioner) and the movement control of the position of parts such as a bumper.

In the embodiments described above, automatic brake control may include preliminary brake control that is executed before the automatic brake control. That is, automatic brake control may be executed in such a way that weak, gentle braking force is generated first and then necessary braking force is generated. Automatic brake control may be replaced by driving force reduction control that reduces the output of the engine or the motor to reduce the driving force or may be implemented by combining automatic brake control with driving force reduction control.

The front radar sensor 12, which is a laser radar sensor in the embodiments described above, may be another radar sensor that uses a radio wave (for example, a millimeter wave) or an ultrasonic wave. Two different types of radar sensors may be used as the first sensor unit 12a and the second sensor unit 12b. One or both of the first sensor unit 12a and the second sensor unit 12b may be implemented by the image sensor 14. For example, when one of the first sensor unit 12a and the second sensor unit 12b is implemented by the image sensor 14, the image sensor 14 and the front radar sensor 12 may be mounted in separate positions or may be mounted integrally in the inner mirror. Even when they are integrally mounted as in the latter case, the radiation direction of the front radar sensor 12 and the imaging direction (optical axis direction) of the image sensor 14 or the image processing range may differ in the side view. In this case, the imaging direction of the image sensor 14 may be near side or the far side of the radiation direction of the front radar sensor 12. When both of the first sensor unit 12a and the second sensor unit 12b are implemented by the image sensor 14, the first sensor unit 12a and the second sensor unit 12b may be implemented by a difference in the image processing range in the image. That is, the first sensor unit 12a detects a forward obstacle in a relatively far image area while the second sensor unit 12b detects a forward obstacle in a relatively near image area.

The present invention, which relates to a forward obstacle (detectable by front radar sensor 12) in the above embodiments, is applicable also to a backward obstacle or a sideways obstacle. For example, the present invention is applicable to the control for avoiding collision at backing time or rear-end collision using a rear laser radar sensor or to the control for avoiding side collision using a side laser radar sensor. When a rear laser radar sensor is used, the insensitive period may be made variable in such a way that the insensitive period becomes longer as the pitch angle of the vehicle (host vehicle) increases (positive in downward direction). In addition, the insensitive period may be made variable in such a way that the insensitive period becomes shorter as the height of a backward obstacle (for example, vehicle height of the following vehicle) is larger. When a side laser radar sensor is used, the insensitive period may be made variable in such a way that the insensitive period becomes shorter as the height of a sideways obstacle (for example, vehicle height of a sideways vehicle) is larger.

In the embodiments, described above, the function of the collision determination ECU 10 may be implemented, in part or in whole, by the brake ECU 20 and the function of the brake ECU 20 may be implemented, in part or in whole, by the collision determination ECU 10.

The invention claimed is:

1. An in-vehicle control device comprising:
a first sensor that acquires obstacle information in a first detection range;
a second sensor that acquires obstacle information in a second detection range, the second detection range being more downward than the first detection range with respect to a host vehicle; and
a processor configured to perform predetermined control for preventing collision with an obstacle or for reducing damage at collision time based on the obstacle information received from the first sensor and the second sensor and, when the obstacle is subsequently not detected by the first sensor and the second sensor after starting the predetermined control based on the obstacle information received from the first sensor, the processor determines whether the predetermined control is to be continued based on positional relation information that indicates a height-direction positional relation between a predetermined part of the obstacle and the first detection range or the second detection range.

2. The in-vehicle control device according to claim 1, wherein
the positional relation information is information representing a height of the predetermined part of the obstacle, information representing a pitch angle of the host vehicle, or information representing a difference between a road slope at a position of the obstacle and a road slope at a position of the host vehicle.

3. The in-vehicle control device according to claim 2, wherein
the processor cancels the predetermined control when a state, in which the obstacle is not detected by the first sensor and the second sensor, continues for a predetermined time during the predetermined control, the predetermined time being made variable based on the positional relation information.

4. The in-vehicle control device according to claim 1, wherein
the processor cancels the predetermined control when a state, in which the obstacle is not detected by the first sensor and the second sensor, continues for a predetermined time during the predetermined control, the predetermined time being made variable based on the positional relation information.

5. The in-vehicle control device according to claim 4, wherein
the predetermined time is made variable in such a way that the predetermined time is made shorter as the pitch angle becomes larger wherein a direction in which a front of the vehicle sinks is a positive direction for the pitch angle of the host vehicle.

6. The in-vehicle control device according to claim 4, wherein
the predetermined time is made variable in such a way that the predetermined time becomes shorter as the predetermined part of the obstacle is higher.

* * * * *